US011485336B2

(12) United States Patent
 Ahn

(10) Patent No.: US 11,485,336 B2
(45) Date of Patent: Nov. 1, 2022

(54) HYDRAULIC BLOCK FOR REDUNDANCY OF ELECTRONIC BRAKING DEVICE FOR VEHICLE

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 78 days.

(21) Appl. No.: 16/795,328

(22) Filed: Feb. 19, 2020

(65) Prior Publication Data

US 2021/0122346 A1    Apr. 29, 2021

(30) Foreign Application Priority Data

Oct. 29, 2019  (KR) .................. 10-2019-0135009

(51) Int. Cl.
  *B60T 8/36*   (2006.01)
  *B60T 13/16*   (2006.01)
  (Continued)

(52) U.S. Cl.
  CPC .......... *B60T 13/168* (2013.01); *B60T 13/686* (2013.01); *B60T 17/18* (2013.01); *F15B 13/085* (2013.01);
  (Continued)

(58) Field of Classification Search
  CPC ...... B60T 8/368; B60T 8/3675; B60T 8/3685; B60T 13/686; B60T 8/363; B60T 17/02;
  (Continued)

(56) References Cited

U.S. PATENT DOCUMENTS 7,407,234 B1 *  8/2008  McCormick ........ F15B 13/0885
                                                    303/119.3
11,001,245 B2 *  5/2021  Dinkel ................... B60T 13/161
                        (Continued)

FOREIGN PATENT DOCUMENTS

DE   10 2014 225 954 A1   6/2016
KR   10-2003-0080358 A   10/2003
                        (Continued)

OTHER PUBLICATIONS

Office Action dated Mar. 9, 2022, issued in corresponding German Patent Application No. 102020103723.6.

*Primary Examiner* — Robert A. Siconolfi
*Assistant Examiner* — Stephen M Bowes
(74) *Attorney, Agent, or Firm* — Morgan, Lewis & Bockius LLP

(57) ABSTRACT

A hydraulic block for redundancy of an electronic braking device may include: a block body having a motor mounting part to which a motor is coupled and a controller mounting part to which an ECU is coupled; hydraulic control ports formed on the block body, and connected to a first output line of a main braking device and a first hydraulic braking line, in order to perform hydraulic braking on ones of front wheels and rear wheels; drain ports formed on the block body, and connected to a second output line of the main braking device and a second hydraulic braking line, in order to reduce the pressure of the others; and a hydraulic circuit configured to form a flow path of operating fluid in the block body, and control the flow rates and pressures of operating fluids passing through the hydraulic control ports and the drain ports.

14 Claims, 8 Drawing Sheets

(51) Int. Cl.
*B60T 13/68* (2006.01)
*B60T 17/18* (2006.01)
*F15B 13/08* (2006.01)

(52) U.S. Cl.
CPC ..... *F15B 13/0814* (2013.01); *B60T 2270/402* (2013.01); *B60T 2270/413* (2013.01); *F15B 13/0842* (2013.01)

(58) Field of Classification Search
CPC ......... B60T 2270/402; B60T 2270/413; Y10S 303/10
See application file for complete search history.

(56) References Cited

U.S. PATENT DOCUMENTS

| | | | | |
|---|---|---|---|---|
| 2010/0032597 | A1* | 2/2010 | Beer | B60T 8/4063 251/129.01 |
| 2010/0264723 | A1* | 10/2010 | Atsushi | B60T 8/3685 303/10 |
| 2011/0062776 | A1* | 3/2011 | Fischbach-Borazio | B60T 8/368 303/116.1 |
| 2016/0107626 | A1* | 4/2016 | Jeon | B60T 13/745 303/15 |

FOREIGN PATENT DOCUMENTS

| | | | |
|---|---|---|---|
| KR | 10-2016-0112258 A | 9/2016 | |
| KR | 10-2018-0101525 A | 9/2018 | |
| WO | WO-2004048173 A2 * | 6/2004 | .......... F15B 13/0835 |

\* cited by examiner

HYDRAULIC BLOCK FOR REDUNDANCY OF ELECTRONIC BRAKING DEVICE FOR VEHICLE

CROSS-REFERENCE TO RELATED APPLICATION

The present application claims priority under 35 U.S.C. § 119(a) to Korean Patent Application No. 10-2019-0135009 filed on Oct. 29, 2019 in the Korean Intellectual Property Office, which is incorporated herein by reference in its entirety.

BACKGROUND

1. Technical Field

Embodiments of the present disclosure relate to a hydraulic block for redundancy of an electronic braking device for vehicle, and more particularly, to a hydraulic block for redundancy of an electronic braking device for braking a vehicle using hydraulic pressure.

2. Related Art

In general, an electronic brake system refers to a system for efficiently preventing a slip which may occur during braking, sudden unintended acceleration or rapid acceleration of a vehicle. Typically, the electronic brake system includes not only a booster device, a master cylinder and a wheel cylinder of a brake system for a vehicle, but also a hydraulic unit for adjusting braking hydraulic pressure and an ECU (Electronic Control Unit) for controlling the hydraulic unit.

The hydraulic unit includes a plurality of solenoid valves for controlling braking hydraulic pressure transferred to the wheel cylinder installed in each wheel, a low-pressure accumulator for temporarily storing oil coming out of the wheel cylinder, a pump driven by a motor, shuttle valves installed at an inlet and an outlet of the pump, respectively, and a driving force control valve. The parts are mounted in a hydraulic block made of aluminum.

The related art of the present disclosure is disclosed in Korean Patent Publication No. 2016-0112258 published on Sep. 28, 2016 and entitled "Electronic Brake System Using Integrated Sensor and Operating Method Thereof".

Recently, autonomous vehicles for targeting fully autonomous driving are developed. Thus, various attempts are made to further strengthen the operation stability of an electronic brake device. However, when an electronic brake part is broken down in the electronic brake device according to the related art, the electronic brake device has a limitation in securing the stability of autonomous driving, because the electronic brake device has no device capable of taking place of the electronic brake part.

Therefore, there is a need for a structure capable of solving the problem.

SUMMARY

Various embodiments are directed to a hydraulic block for redundancy of an electronic braking device for vehicle which can be applied as an auxiliary braking device capable of performing a braking function in place of a main braking device in case of a breakdown of the main braking device, and installed efficiently in space with the main braking device.

In an embodiment, a hydraulic block for redundancy of an electronic braking device for vehicle may include: a block body having a motor mounting part to which a motor is coupled and a controller mounting part to which an ECU (Electronic Control Unit) is coupled; hydraulic control ports formed on the block body, and connected to a first output line of a main braking device and a first hydraulic braking line for individually adjusting wheels, in order to perform hydraulic braking on ones of front wheels and rear wheels; drain ports formed on the block body, and connected to a second output line of the main braking device and a second hydraulic braking line for individually adjusting the wheels, in order to reduce the pressure of the others of the front wheels and the rear wheels; and a hydraulic circuit configured to form a flow path of operating fluid in the block body, and control the flow rates and pressures of operating fluids passing through the hydraulic control ports and the drain ports, and having valves housed therein, the valves being mounted in the ECU.

The hydraulic control ports may include: an input port part connected to the first output line; and an output port part connected to the first hydraulic braking line.

The input port part may include: a first input port connected to one side of the first output line; and a second input port connected to the other side of the first output line.

The output port part may include: a first output port through which fluid introduced into the block body through the first input port is discharged; and a second output port through which fluid introduced into the block body through the second input port is discharged.

The motor mounting part may be formed on a front surface of the block body, and the controller mounting part may be formed on a rear surface of the block body. One of the first and second input ports may be disposed on a top surface of the block body with the first and second output ports, and the other of the first and second input ports may be formed on the front surface of the block body and disposed under a pump mounting bore.

The motor mounting part may be formed on a front surface of the block body, and the controller mounting part may be formed on a rear surface of the block body. One of the first and second output ports may be disposed on the top surface of the block body with the first and second input ports, and the other of the first and second output ports may be formed on the front surface of the block body and disposed under a pump mounting bore.

The drain ports may include: a drain input port connected to the second output line; and a drain output port through which fluid introduced into the block body through the drain input port is discharged.

One of the drain input port and the drain output port may be disposed on the top surface of the block body with one of the first and second input ports, the first output port and the second output port, the other of the first and second input ports may be formed on the front surface of the block body, disposed under a pump mounting bore, and disposed on one side of the left and right sides of the motor mounting part, and the other of the drain input port and the drain output port may be formed on the front surface of the block body, disposed under the pump mounting bore, and disposed on the other side of the left and right sides of the motor mounting part.

One of the drain input port and the drain output port may be disposed on the top surface of the block body with one of the first and second output ports, the first input port and the second input port, the other of the first and second output ports may be formed on the front surface of the block body, disposed under the pump mounting bore, and disposed on one side of the left and right sides of the motor mounting part, and the other of the drain input port and the drain output port may be formed on the front surface of the block body, disposed under the pump mounting bore, and disposed on the other side of the left and right sides of the motor mounting part.

The hydraulic block may further include one or more reservoir ports formed on the block body and connected to a reservoir line for supplying operating fluid to a reservoir.

The hydraulic circuit may include: a first braking flow path extended from the first input port to the first output port, and having hydraulic pressure controlled by the valve; a second braking flow path extended from the second input port to the second output port, and having hydraulic pressure controlled by the valve; a bypass flow path extended from the drain input port to the drain output port; and a drain flow path extended from the bypass flow path to the reservoir port.

The reservoir port may be formed on the front surface of the block body, and disposed above the pump mounting bore.

The reservoir port may include: a first reservoir port disposed above the pump mounting bore, and disposed on one side of the left and right sides of the motor mounting part; and a second reservoir port disposed above the pump mounting bore, and disposed on the other side of the left and right sides of the motor mounting part.

In accordance with the embodiment of the present disclosure, the hydraulic block for redundancy of the electronic braking device, which is configured as described above, includes the hydraulic control ports and the hydraulic circuit which can implement hydraulic braking for ones of the front wheels and the rear wheels, when implementing the hydraulic braking function in case of redundancy. In other words, the hydraulic block may have a simple configuration for performing hydraulic braking on two wheels. Therefore, the hydraulic block may have a smaller size than the existing main braking device.

Thus, when the main braking device and the auxiliary braking device are disposed together in a limited space, the degree of freedom can be further secured in terms of the disposition directions and positions of the main braking device and the auxiliary braking device, and the main braking device and the auxiliary braking device may be disposed efficiently in terms of space. Furthermore, the hydraulic block for redundancy of the electronic braking device can be reduced in size and weight, which makes it possible to reduce the manufacturing cost.

Furthermore, as the drain ports as well as the hydraulic control ports are formed, ones of the front wheels and the rear wheels may be subjected to hydraulic braking in case of redundancy, and simultaneously, the operating fluids supplied to the others of the front wheels and the rear wheels may be drained and depressurized, which makes it possible to secure the stability of motor braking.

DETAILED DESCRIPTION

Hereinafter, a hydraulic block for redundancy of an electronic braking device for vehicle will be described below with reference to the accompanying drawings through various examples of embodiments. It should be noted that the drawings are not to precise scale and may be exaggerated in thickness of lines or sizes of components for descriptive convenience and clarity only.

Furthermore, the terms as used herein are defined by taking functions of the disclosure into account and can be changed according to the custom or intention of users or operators. Therefore, definition of the terms should be made according to the overall disclosures set forth herein.

Figure 1:
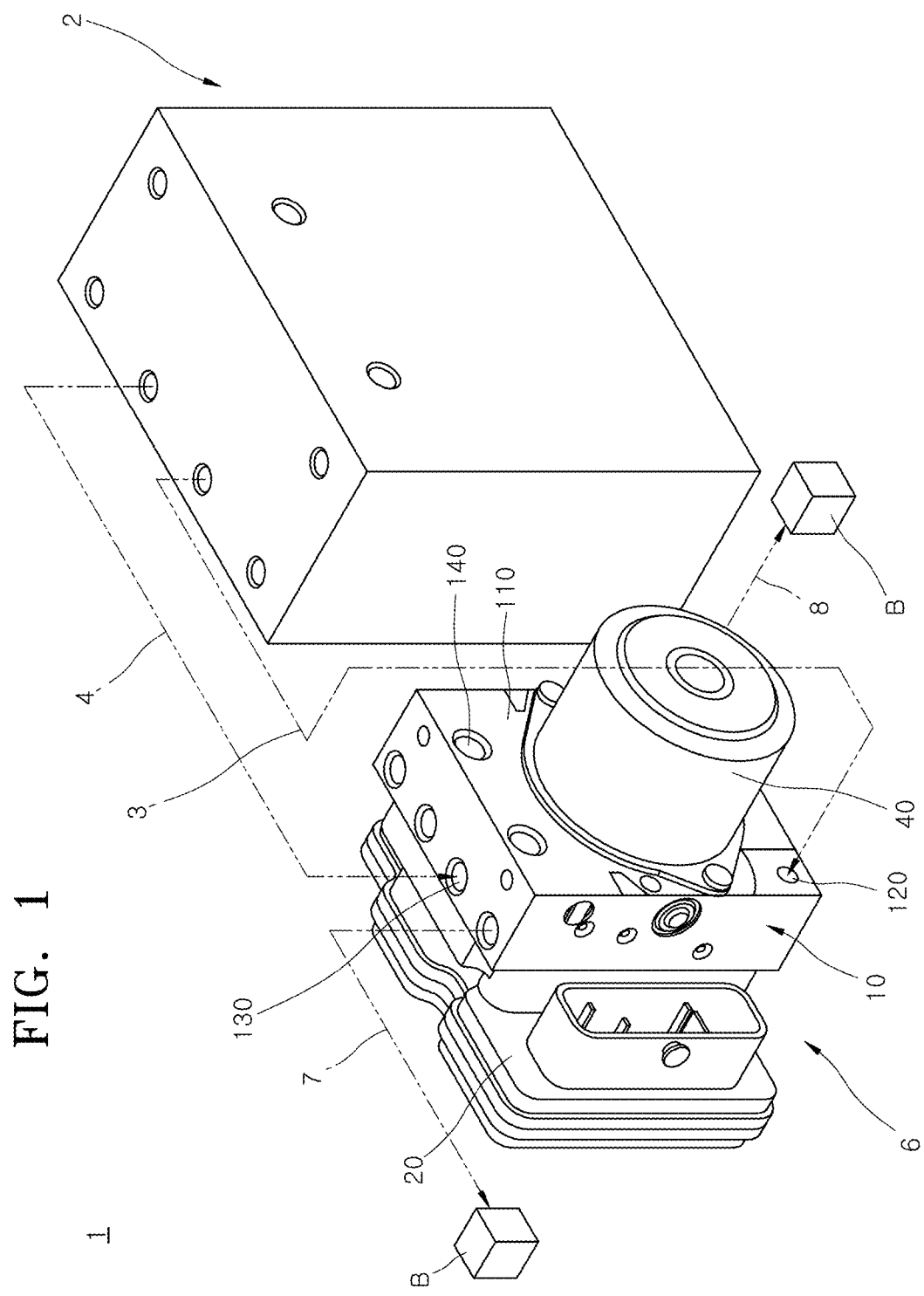
FIG. 1 is a conceptual view schematically illustrating an electronic braking device to which a hydraulic block for redundancy of an electronic braking device for vehicle in accordance with an embodiment of the present disclosure is applied.
Figure 2:
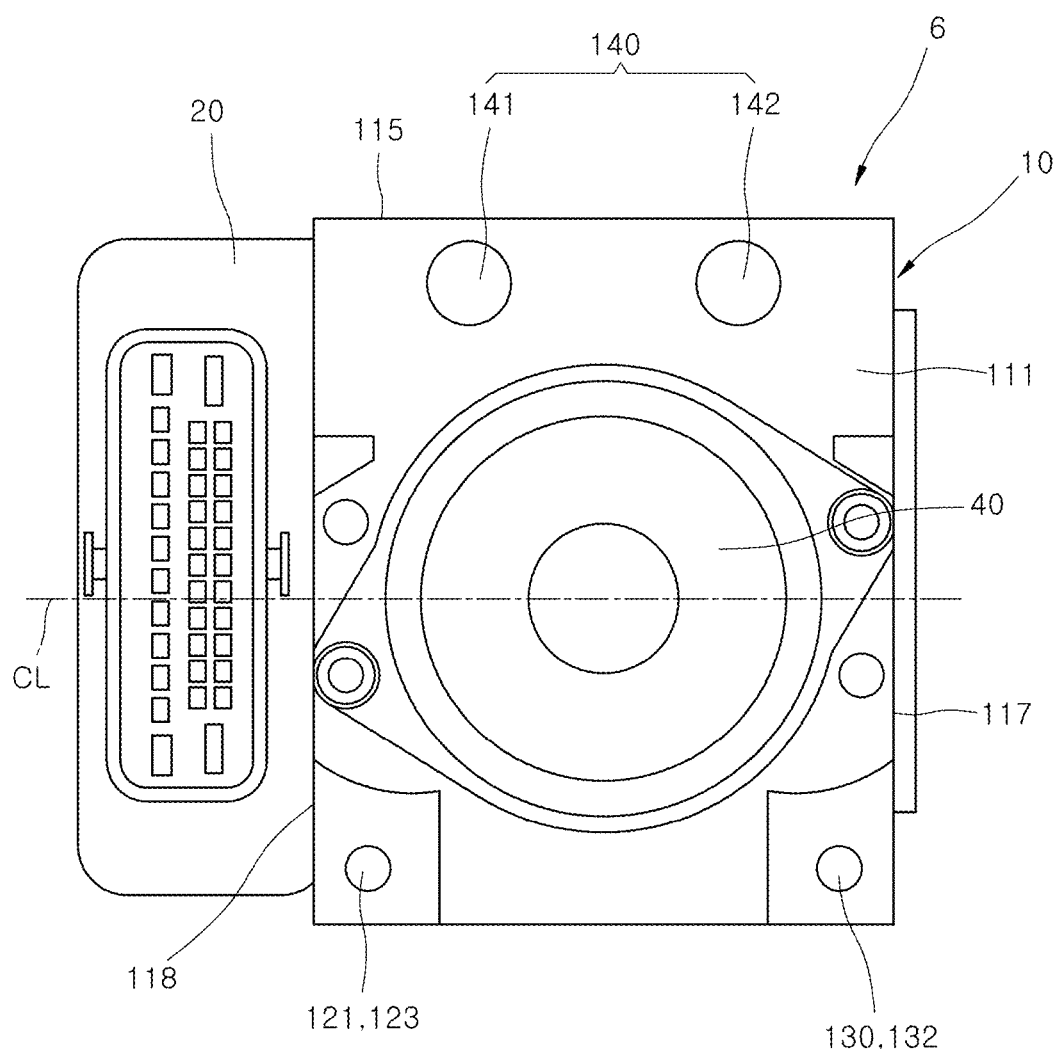
FIG. 2 is a front view schematically illustrating an auxiliary braking device of the electronic braking device in accordance with the embodiment of the present disclosure.

FIG. 1 is a conceptual view schematically illustrating an electronic braking device to which a hydraulic block for redundancy of an electronic braking device in accordance with an embodiment of the present disclosure is applied, and FIG. 2 is a front view schematically illustrating an auxiliary braking device of the electronic braking device in accordance with the embodiment of the present disclosure.

Referring to FIGS. 1 and 2, the electronic braking device 1 in accordance with the embodiment of the present disclosure includes a main braking device 2 and an auxiliary braking device 6.

The main braking device 2 serves to mainly implement a function of braking a vehicle in a normal state. The main braking device 2 receives operating fluid from a reservoir 5, controls the received fluid to preset hydraulic pressure, and transfers the controlled fluid to a CBS (Conventional Brake System) B for individually controlling the wheels. The main braking device 2 corresponds to an electronic braking device such as an ABS (Anti-Lock Brake System), EBD (Electronic Brake force Distribution system) or ESC (Electronic Stability Control).

The auxiliary braking device 6 is installed for redundancy of vehicle braking, and has a structure capable of performing a braking function which has been performed by the main braking device 2, in place of the main braking device 2, in case of a breakdown of the main braking device 2. The auxiliary braking device 6 is disposed on the downstream side of the main braking device 2. In other words, the auxiliary braking device 6 is disposed on the path through which fluid is transferred from the main braking device 2 to the CBS B. In case of a breakdown of the main braking device 2, the auxiliary braking device 6 receives fluid supplied to the main braking device 2 from the reservoir 5, controls the received fluid to the target pressure, and transfers the controlled fluid to the CBS B.

In accordance with the embodiment of the present disclosure, in case of redundancy, ones of front wheels and rear wheels are mainly subjected to hydraulic braking by the auxiliary braking device 6, and the other ones of the front wheels and the rear wheels are mainly subjected to motor braking by an EPB (Electronic Parking Brake) motor or the like. For example, a front-wheel drive vehicle may stably perform a braking function by performing hydraulic braking on front wheels and performing motor braking on rear wheels. In addition, a rear-wheel drive vehicle may stably perform a braking function by performing hydraulic braking on rear wheels and performing motor braking on front wheels.

The main braking device 2 has four fluid supply lines for hydraulic braking of four wheels, respectively. In the descriptions of the present disclosure, a fluid supply line for implementing hydraulic braking in case of redundancy is referred to as a first output line 3, and a fluid supply line for implementing motor braking is referred to as a second output line 4.

Among fluid supply lines for transferring fluid having passed through the auxiliary braking device 6 to the CBSs B for individually controlling the wheels, a fluid supply line corresponding to the first output line 3, i.e. a fluid supply line for implementing hydraulic braking, is referred to as a first hydraulic braking line 7. Also, among the fluid supply lines for transferring the fluid having passed through the auxiliary braking device 6 to the CBSs B for individually controlling the wheels, a fluid supply line corresponding to the second output line 4, i.e. a fluid supply line for implementing motor braking, is referred to as a second hydraulic braking line 8.

The auxiliary braking device 6 is disposed between the first output line 3 and the first hydraulic braking line 7. Also, the auxiliary braking device 6 is disposed between the second output line and the second hydraulic braking line 8. Hereafter, for convenience of description, the case in which the present embodiment is applied to a front-wheel drive vehicle will be taken as an example for description. Suppose that front wheels are subjected to hydraulic braking and rear wheels are subjected to motor braking (see FIG. 8).

Figure 3:
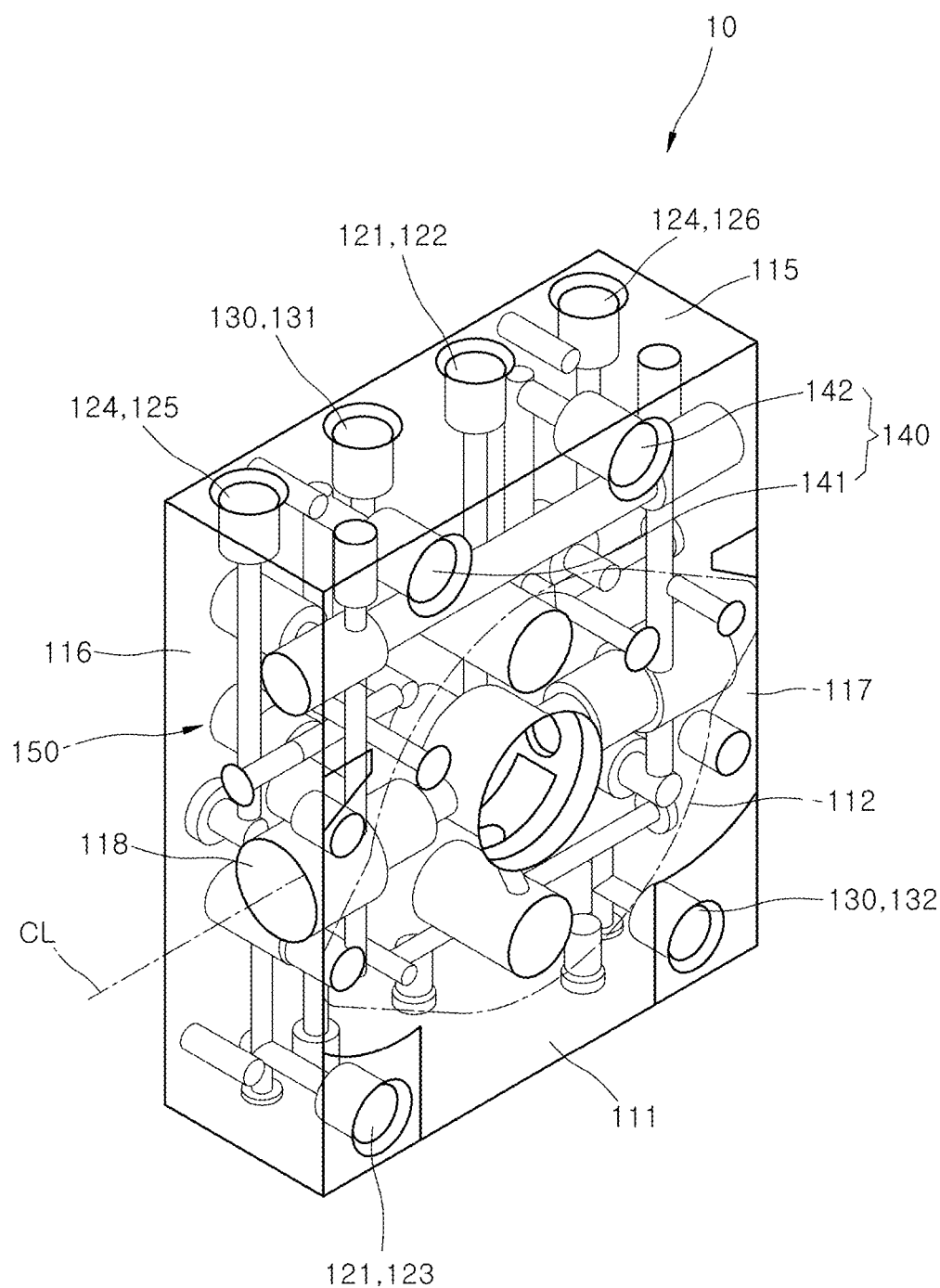
FIG. 3 is a perspective view illustrating main parts of an internal flow path of the hydraulic block for redundancy of the electronic braking device in accordance with the embodiment of the present disclosure.
Figure 4:
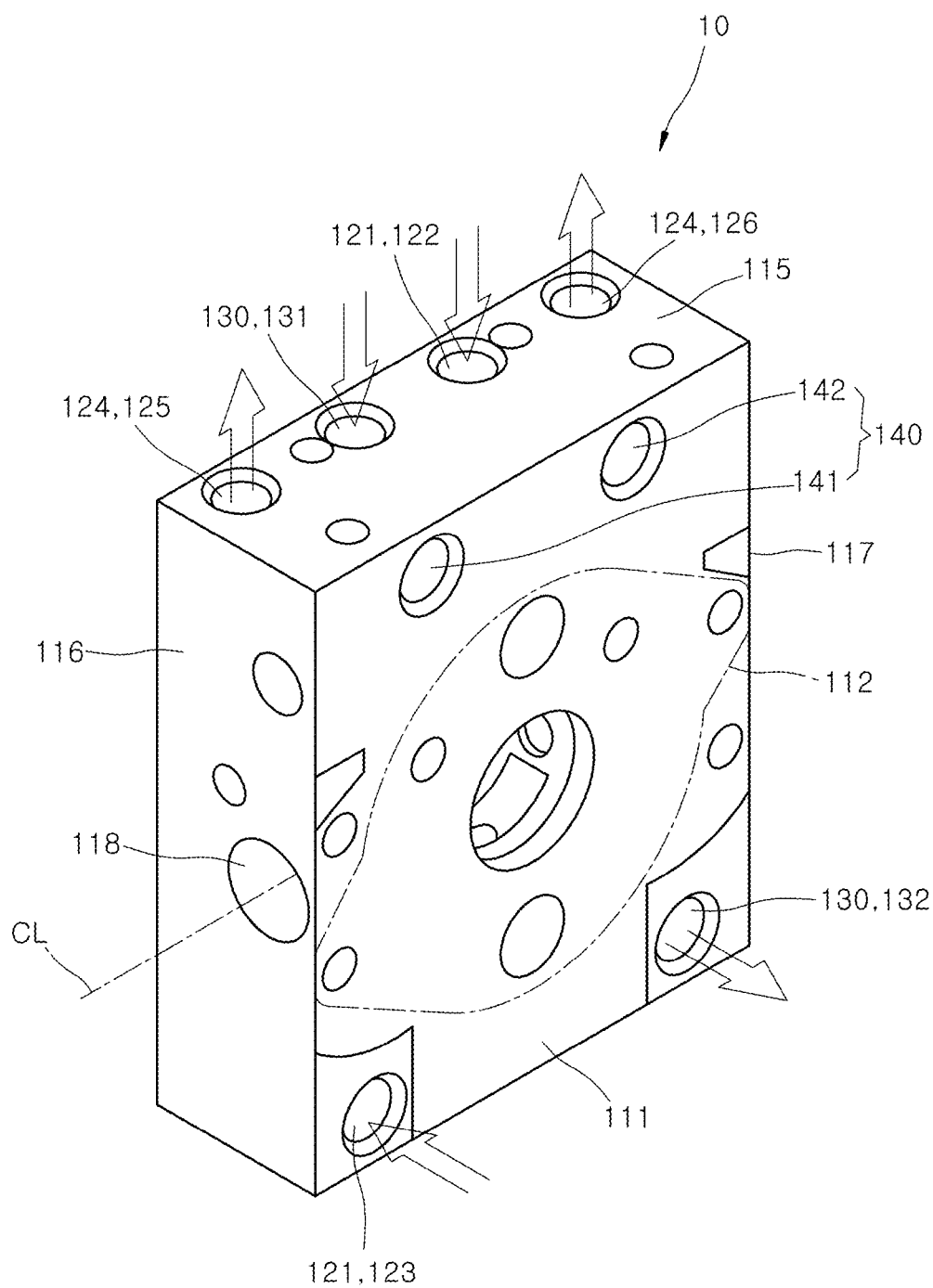
FIG. 4 is a front perspective view schematically illustrating the hydraulic block for redundancy of the electronic braking device in accordance with the embodiment of the present disclosure.
Figure 5:
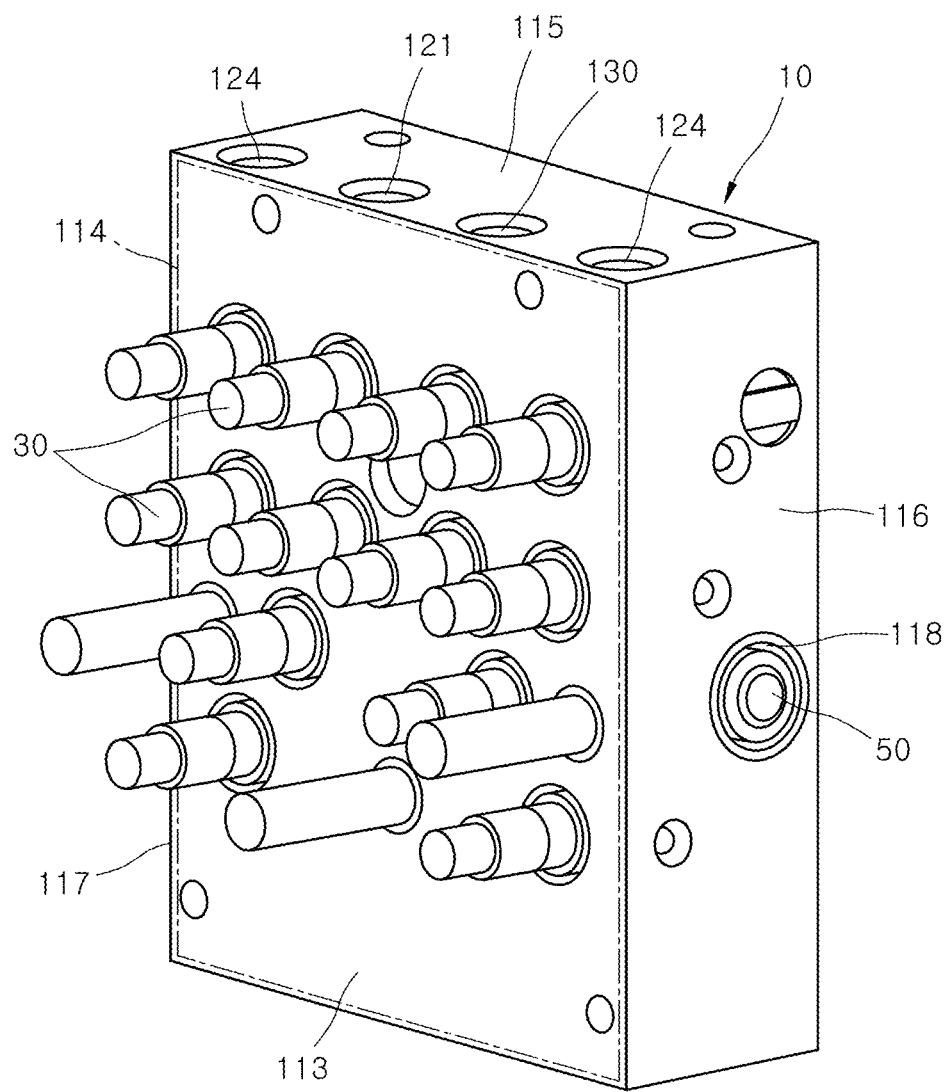
FIG. 5 is a rear perspective view schematically illustrating the hydraulic block for redundancy of the electronic braking device in accordance with the embodiment of the present disclosure.

FIG. 3 is a perspective view illustrating main parts of an internal flow path of the hydraulic block for redundancy of the electronic braking device in accordance with the embodiment of the present disclosure, FIG. 4 is a front perspective view schematically illustrating the hydraulic block for redundancy of the electronic braking device in accordance with the embodiment of the present disclosure, and FIG. 5 is a rear perspective view schematically illustrating the hydraulic block for redundancy of the electronic braking device in accordance with the embodiment of the present disclosure.

Referring to FIGS. 2 and 5, the auxiliary braking device 6 in accordance with the embodiment of the present disclosure includes a hydraulic block 10, an ECU 20, a valve 30 and a motor 40.

The hydraulic block 10 functions as a pump housing, and includes four hydraulic control ports 120 for hydraulic braking of the front wheels, two drain ports 130 for motor braking of the rear wheels, one or more reservoir ports 140 connected to a reservoir line 9 for supplying operating fluid to the reservoir 5, and a hydraulic circuit 150 for controlling the pressure of fluid in the hydraulic block 10, as indicated by a thin solid line in FIG. 3.

The ECU 20 for electronically controlling fluid passing through the hydraulic block 10 is coupled to a rear surface 113 of the hydraulic block 10. The ECU 20 has the plurality of valves 30 for adjusting the hydraulic pressure and flow rate of fluid passing through the hydraulic block 10. The ECU 20 controls operations of the valves 30.

The motor 40 for forcing fluid in the hydraulic block 10 to flow in a preset direction is coupled to a front surface 111 of the hydraulic block 10. Since the ECU 20 and the motor 40 have structures disclosed in an existing electronic braking device or the main braking device 2, the detailed descriptions of the ECU 20 and the motor 40 will be omitted herein.

Referring to FIGS. 3 to 5, the hydraulic block 10 for redundancy of the electronic braking device in accordance with the embodiment of the present disclosure includes a block body 110, the hydraulic control ports 120, the drain ports 130, the reservoir ports 140 and the hydraulic circuit 150.

The block body 110 has a rectangular parallelepiped shape in which the front surface 111 and the rear surface 113 have a larger area than a top surface 115, a bottom surface, a left side surface 116 and a right side surface 117. The motor 40 is mounted on the front surface 111 of the block body 110. In the descriptions of the present embodiment, the portion to which the motor 40 is coupled is referred to as a motor mounting part 112. The ECU 20 is coupled to the rear surface 113 of the block body 110. In the descriptions of the present embodiment, the portion to which the ECU 20 is coupled is referred to as a controller mounting part 114.

The hydraulic control ports 120 serve to control the pressure of operating fluid, which is supplied to the front wheels for hydraulic braking of the front wheels, to the target pressure. The block body 110 has the four hydraulic control ports 120 formed thereon. Among the hydraulic control ports 120, two hydraulic control ports are connected to the first output line 3, and the other two hydraulic control ports are connected to the first hydraulic braking line 7 for individually adjusting a left front wheel FL and a right front wheel FR.

The hydraulic control ports 120 include an input port part 121 connected to the first output line 3 and an output port part 124 connected to the first hydraulic braking line 7. The input port part 121 includes a first input port 122 connected to the left front wheel FL on the first output line 3, and a second input port 123 connected to the right front wheel FR on the first output line 3. The output port part 124 includes a first output port 125 through which fluid introduced into the block body 110 through the first input port 122 is discharged and a second output port 126 through which fluid introduced into the block body 110 through the second input port 123 is discharged.

The drain ports 130 serve to reduce the pressure of operating fluid supplied to the rear wheels, in order to stably implement motor braking of the rear wheels without interference of the hydraulic pressure. The block body 110 has the two drain ports 130 formed thereon. The drain ports 130 include one drain input port 131 connected to the second output line 4 and one drain output port 131 connected to the second hydraulic braking line 8 for individually controlling the rear wheels.

The drain ports 130 include a drain input port 131 connected to the second output line 4 and a drain output port 132 through which fluid introduced into the block body 110 through the drain input port 131 is discharged.

The two second output lines 4 are extended toward a left rear wheel RL and a right rear wheel RR, respectively, and connected to communicate with each other in the main braking device 2. Thus, although only one of the two second output lines 4 is depressurized, both of the two second output lines 4 are depressurized. The drain ports 130 in accordance with the embodiment of the present disclosure have one drain input port 131 to which only one of the two second output lines 4 is connected.

The number and connection positions of the drain ports 130 in accordance with the embodiment of the present disclosure are described under the supposition that the front wheels are subjected to hydraulic braking and the rear wheels are subjected to motor braking. However, the present embodiment is not limited thereto. The drain ports 130 may be connected to one or more of the front and rear wheels, as long as the pressure of the operating fluid can be reduced for motor braking.

Figure 6:
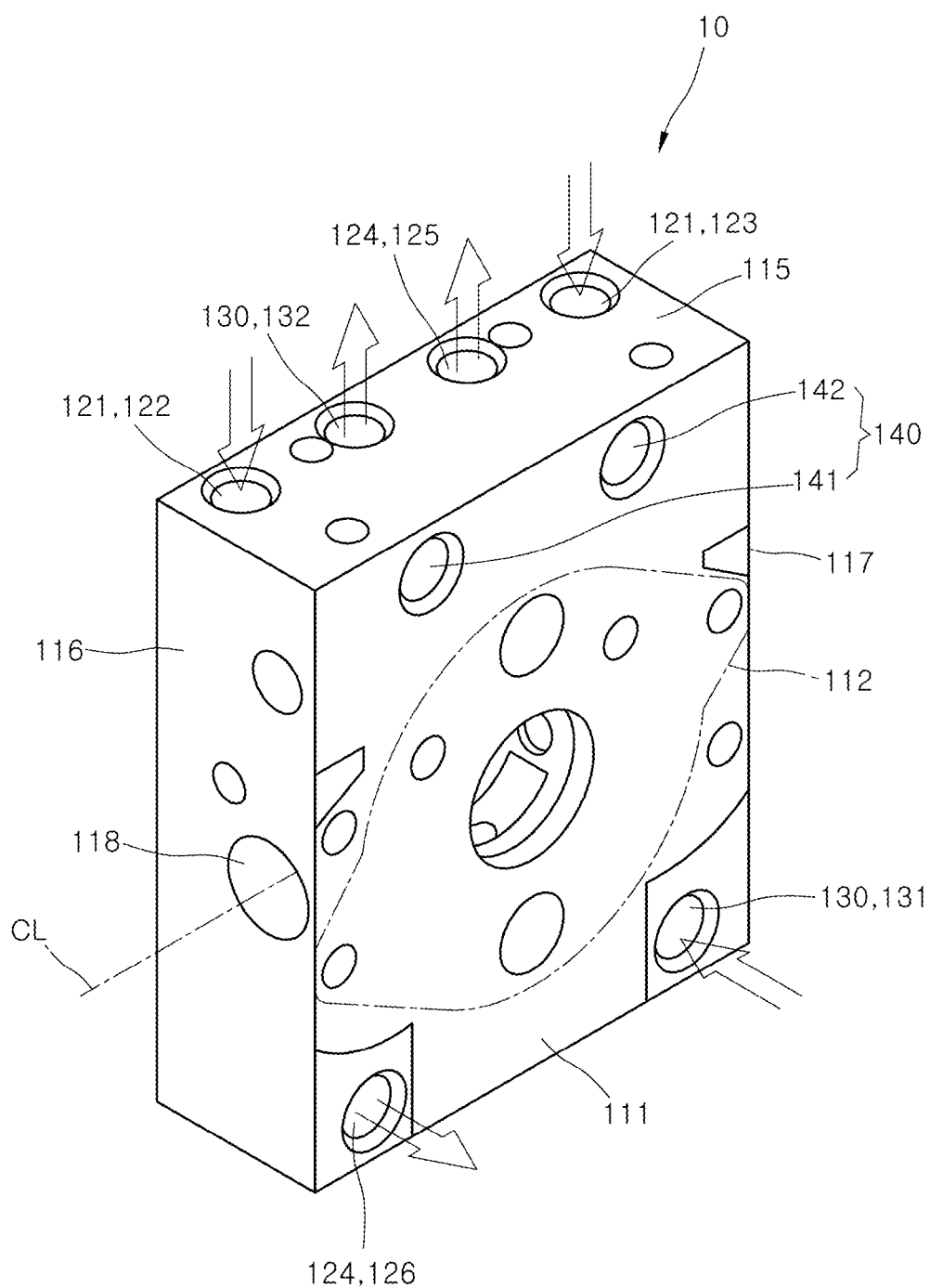
FIG. 6 is a perspective view schematically illustrating a hydraulic block for redundancy of an electronic braking device for vehicle in accordance with another embodiment of the present disclosure.
Figure 7:
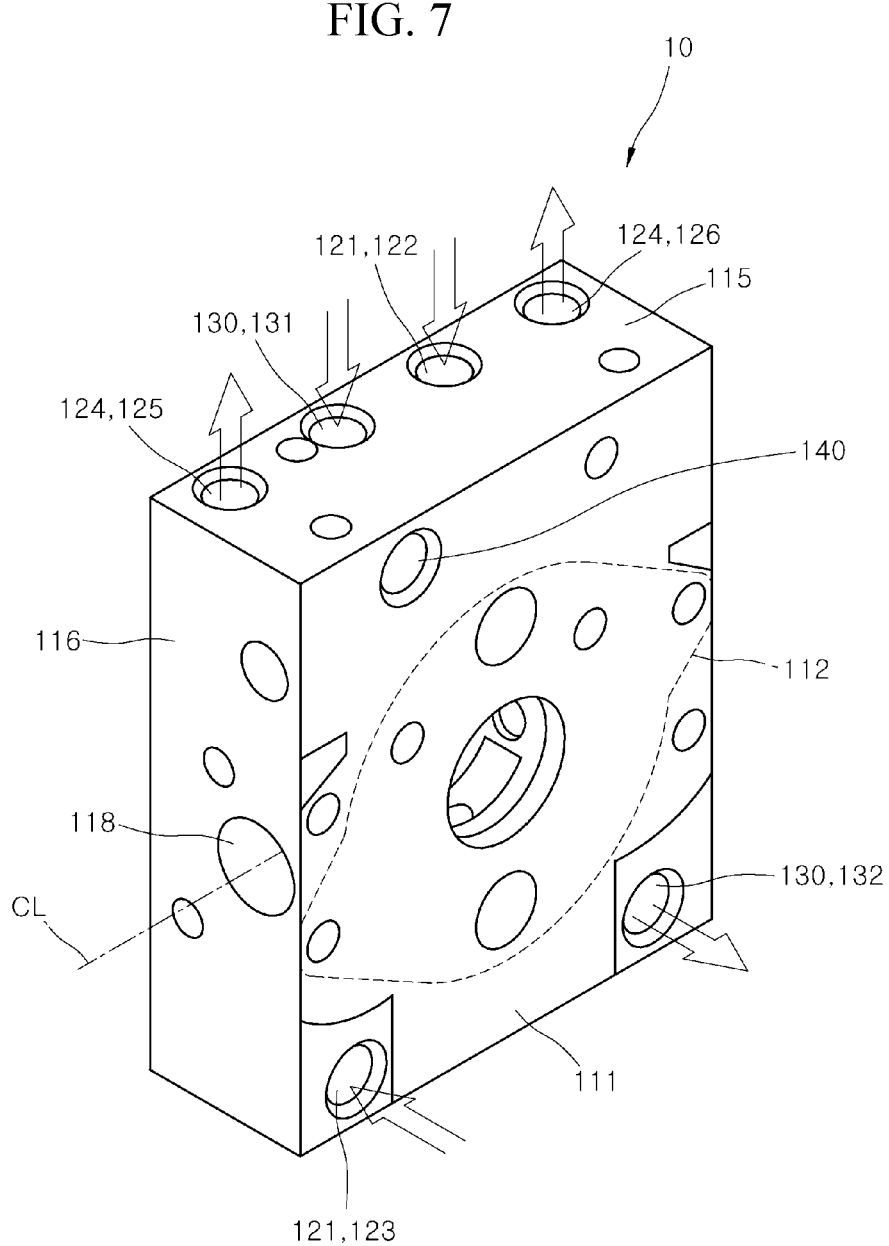
FIG. 7 is a perspective view schematically illustrating a hydraulic block for redundancy of an electronic braking device for vehicle in accordance with still another embodiment of the present disclosure.
Figure 8:
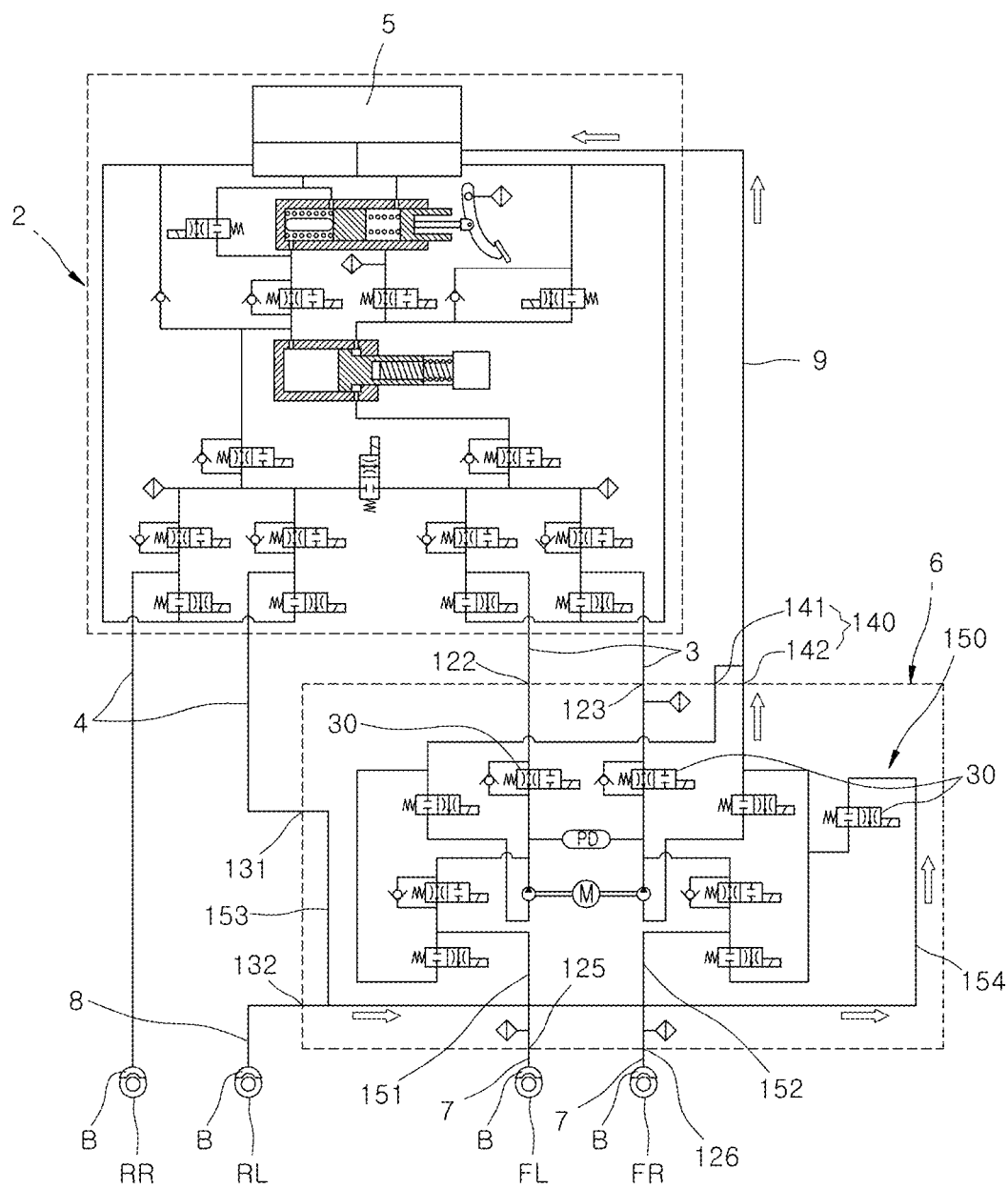
FIG. 8 is a hydraulic circuit diagram of the electronic braking device to which the hydraulic block for redundancy of an electronic braking device for vehicle in accordance with the embodiment of the present disclosure is applied.

FIG. 6 is a perspective view schematically illustrating a hydraulic block for redundancy of an electronic braking device for vehicle in accordance with another embodiment of the present disclosure, FIG. 7 is a perspective view schematically illustrating a hydraulic block for redundancy of an electronic braking device for vehicle in accordance with still another embodiment of the present disclosure, and FIG. 8 is a hydraulic circuit diagram of an electronic braking device to which the hydraulic block for redundancy of an electronic braking device for vehicle in accordance with the embodiment of the present disclosure is applied.

The hydraulic block 10 includes a reservoir port 140 connected to the reservoir line 9 for supplying operating fluid to the reservoir 5. The operating fluid, which needs to be discharged to the outside of the block body 110 during a process of adjusting hydraulic pressure through the hydraulic control ports 120 and the drain ports 130, is supplied to the reservoir 5 through the reservoir ports 140. The hydraulic block 10 may include two reservoir ports 140 as illustrated in FIG. 4 or one reservoir port as illustrated in FIG. 7.

The hydraulic circuit 150 forms a flow path of operating fluid in the block body 110, and adjusts the flow rate and pressure of the operating fluid passing through the hydraulic control ports 120 and the drain ports 130 using the valves 30 and a pump member 50. Referring to FIG. 8, the hydraulic circuit 150 in accordance with the embodiment of the present disclosure includes a first braking flow path 151, a second braking flow path 152, a bypass flow path 153 and a drain flow path 154.

The first braking flow path 151 is extended from the first input port 122 to the first output port 125, and has hydraulic pressure adjusted through the plurality of valves 30 mounted in the ECU 20. The second braking flow path 152 is extended from the second input port 123 to the second output port 126, and has hydraulic pressure adjusted by the plurality of valves 30 mounted in the ECU 20.

While operating fluids pass through the first and second braking flow paths 151 and 152, hydraulic pressures for braking the left front wheel FL and the right front wheel FR are formed and transferred to the CBSs B for braking the left front wheel FL and the right front wheel FR through the first hydraulic braking lines 7, respectively.

The first and second braking flow paths 151 and 152 simply serve as paths through which the operating fluid are passed, while the operation of the main braking device 2 is normally performed. In case of redundancy, however, the first and second braking flow paths 151 and 152 adjust the hydraulic pressures of the operating fluids introduced through the first output lines 3 and transfer the adjusted hydraulic pressures to the first hydraulic braking lines 7.

The bypass flow path 153 is extended from the drain input port 131 to the drain output port 132. The drain flow path 154 is extended from the bypass flow path 153 to the reservoir port 140. One of the two second output lines 4 is sequentially connected to the drain input port 131, the bypass flow path 153 and the drain output port 132. That is, one of the two second output lines 4 is connected to the CBS B for braking the left rear wheel RL through the bypass flow path 153. The other of the two second output lines 4 is directly connected to the CBS B for braking the right rear wheel RR.

While the operation of the main braking device 2 is normally performed, the operating fluid introduced into the one of the two second output lines 4 transfers hydraulic pressure to the CBS B for braking the left rear wheel RL through the second hydraulic braking line 8 via the bypass flow path 153, and the operating fluid introduced into the other of the two second output lines 4 directly transfers hydraulic pressure to the CBS B for braking the right rear wheel RR.

When the drain flow path 154 is activated by the operations of the pump member 50, the valves 30 and the like in case of redundancy, the operating fluid introduced into the bypass flow path 153 is discharged to the outside of the hydraulic block 10 through the drain flow path 154 and the reservoir port 140, and stored in the reservoir 5 through the reservoir line 9.

Such a flow of the operating fluid may reduce not only the pressures of the second hydraulic braking line 8 and the second output line 4 connected to the bypass flow path 153, but also the pressure of the other second output line 4 communicating with the bypass flow path 153 in the main braking device 2. Through such an operation, motor braking for both of the left and right rear wheels RL and RR can be stably implemented without interference with the hydraulic pressure.

The main braking device 2 has a structure for individually performing hydraulic braking on the four wheels. However, the hydraulic block 10 for redundancy of the electronic braking device in accordance with the embodiment of the present disclosure may have a simpler structure for performing hydraulic braking on two wheels. Therefore, the hydraulic block 10 for redundancy of the electronic braking device in accordance with the embodiment of the present disclosure does not need to have the same or similar size as or to the existing main braking device 2, in order to implement hydraulic braking in case of redundancy. Therefore, as illustrated in FIG. 1, the hydraulic block 10 may have a smaller size than the existing main braking device 2.

Therefore, when the main braking device 2 and the auxiliary braking device 6 are disposed together in a limited space, a higher degree of freedom can be secured in terms of the disposition directions and positions of the main braking device 2 and the auxiliary braking device 6, and the main braking device 2 and the auxiliary braking device 6 may be disposed efficiently in space. Furthermore, the front wheels or the rear wheels which mainly contribute to driving and braking the vehicle can be selectively subjected to hydraulic braking, and the operating fluids supplied to the wheels subjected to motor braking can be drained and depressurized.

Referring to FIGS. 4 and 5, the hydraulic block 10 in accordance with the embodiment of the present disclosure has a structure in which the motor mounting part 112 is formed on the front surface 111 of the block body 110, and the controller mounting part 114 is formed on the rear surface 113 of the block body 110. Furthermore, the hydraulic block 10 has a structure in which the first input port 122, the first output port 125, the second output port 126 and the drain input port 131 are disposed in a line on the top surface 115 of the block body 110.

The hydraulic block 10 has a structure in which the second input port 123 and the drain output port 132 are disposed on the front surface 111 of the block body 110 under a pump mounting bore 118, and disposed on the left and right sides of the motor mounting part 112, respectively. The pump mounting bore 118 is disposed on a horizontal line CL based on the center of the motor mounting part 112, and formed in a hollow shape on the left side surface 116 and the right side surface 117. The pump member 50 is mounted in the pump mounting bore 118.

The reservoir port 140 is disposed on the front surface 111 of the block body 110 above the pump mounting bore 118. More specifically, the reservoir port 140 includes a pair of first and second reservoir ports 141 and 142, and the first and second reservoir ports 141 and 142 are disposed above the pump mounting bore 118, and disposed on the left and right sides of the motor mounting part 112, respectively.

As one of the first and second input ports 122 and 123 is disposed on the top surface 115 and the other of the first and second input ports 122 and 123 is disposed at the bottom of the front surface 111 as described above, the three output lines including the two first output lines 3 and the second output line 4 connected to the drain input port 131 may not be concentrated only in the space above the motor 40, but be efficiently disposed in the space under the motor 40, while avoiding interference therebetween.

As one of the drain input port 131 and the drain output port 132 is disposed on the top surface 115, the other of the drain input port 131 and the drain output port 132 is disposed at the bottom of the front surface 111, and the reservoir port 140 is disposed at the top of the front surface 111, the reservoir port 140 is located on the extension path from the input port part 121 to the output port part 124 and the extension path from the drain input port 131 to the drain output port 132. Thus, when the drain flow path 154 is formed in the hydraulic block 10 having a rectangular parallelepiped shape so as to communicate with the first braking flow path 151, the second braking flow path 152 and the bypass flow path 153, the disposition and design of the flow path may be achieved efficiently in terms of space, while the extension length of the flow path is minimized.

Referring to FIG. 6, the hydraulic block 10 in accordance with another embodiment of the present disclosure has a structure in which the first input port 122, the second input port 123, the first output port 125 and the drain output port 132 are disposed in a line on the top surface 115 of the block body 110, unlike the hydraulic block 10 illustrated in FIGS. 4 and 5. Furthermore, the hydraulic block 10 illustrated in FIG. 6 has a structure in which the second output port 126 and the drain input port 131 are disposed on the front surface 111 of the block body 110 under the pump mounting bore 118, and disposed on the left and right sides of the motor mounting part 112, respectively.

As one of the first and second output ports 125 and 126 is disposed on the top surface 115 and the other of the first and second output ports 125 and 126 is disposed at the bottom of the front surface 111 as described above, the second hydraulic braking line 8 connected to the two first hydraulic braking line 7 and the drain output port 132 is evenly divided and located in the spaces over and under the motor 40. Therefore, the plurality of hydraulic braking lines including the first and second hydraulic braking lines 7 and 8 may be disposed efficiently in terms of space, while avoiding interference with the plurality of output lines including the first and second output lines 3 and 4.

The hydraulic block 10 for redundancy of the electronic braking device 1 in accordance with the embodiment of the present disclosure, which is configured as described above, includes the hydraulic control ports 120 and the hydraulic circuit 150 which can implement hydraulic braking for ones of the front wheels and the rear wheels, when implementing the hydraulic braking function in case of redundancy. In other words, the hydraulic block 10 may have a simple configuration for performing hydraulic braking on two wheels. Therefore, the hydraulic block 10 may have a smaller size than the existing main braking device 2.

Thus, when the main braking device 2 and the auxiliary braking device 6 are disposed together in a limited space, the degree of freedom can be further secured in terms of the disposition directions and positions of the main braking device 2 and the auxiliary braking device 6, and the main braking device 2 and the auxiliary braking device 6 may be disposed efficiently in terms of space. Furthermore, the hydraulic block 10 for redundancy of the electronic braking device can be reduced in size and weight, which makes it possible to reduce the manufacturing cost.

Furthermore, as the drain ports 130 as well as the hydraulic control ports 120 are formed, ones of the front wheels and the rear wheels may be subjected to hydraulic braking in case of redundancy, and simultaneously, the operating fluids supplied to the others of the front wheels and the rear wheels may be drained and depressurized, which makes it possible to secure the stability of motor braking.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A hydraulic block for redundancy of an electronic braking device for vehicle, comprising:
    a block body having a motor mounting part to which a motor is coupled and a controller mounting part to which an ECU (Electronic Control Unit) is coupled;
    hydraulic control ports provided on the block body, and connected to a first output line of a main braking device and a first hydraulic braking line for individually adjusting wheels, in order to perform hydraulic braking on ones of front wheels and rear wheels;
    drain ports provided on the block body, and connected to a second output line of the main braking device and a second hydraulic braking line for individually adjusting the wheels, in order to reduce the pressure of the others of the front wheels and the rear wheels; and
    a hydraulic circuit configured to form a flow path of operating fluid in the block body, and control the flow rates and pressures of operating fluids passing through the hydraulic control ports and the drain ports, and having valves housed therein, the valves being mounted in the ECU,
    wherein the drain ports comprise:
        a drain input port connected to the second output line; and
        a drain output port through which fluid introduced into the block body through the drain input port is discharged, the hydraulic control ports comprise:
an input port part connected to the first output line; and
an output port part connected to the first hydraulic braking line, and
the input port part comprises:
a first input port connected to one side of the first output line; and
a second input port connected to the other side of the first output line.

2. The hydraulic block for redundancy of an electronic braking device for vehicle of claim 1, further comprising:
one or more reservoir ports disposed on the block body and connected to a reservoir line for supplying operating fluid to a reservoir.

3. The hydraulic block for redundancy of an electronic braking device for vehicle of claim 2, wherein the one or more reservoir ports are disposed on a front surface of the block body, and disposed above a pump mounting bore.

4. The hydraulic block for redundancy of an electronic braking device for vehicle of claim 2, wherein the one or more reservoir ports comprise:
a first reservoir port disposed above the pump mounting bore, and disposed on one side of the left and right sides of the motor mounting part; and
a second reservoir port disposed above the pump mounting bore, and disposed on the other side of the left and right sides of the motor mounting part.

5. The hydraulic block for redundancy of an electronic braking device for vehicle of claim 1, wherein the output port part comprises:
a first output port through which fluid introduced into the block body through the first input port is discharged; and
a second output port through which fluid introduced into the block body through the second input port is discharged.

6. The hydraulic block for redundancy of an electronic braking device for vehicle of claim 5, wherein the motor mounting part is disposed on a front surface of the block body, and
the controller mounting part is disposed on a rear surface of the block body,
wherein one of the first and second input ports is disposed on a top surface of the block body with the first and second output ports, and
the other of the first and second input ports is disposed on the front surface of the block body and disposed under a pump mounting bore.

7. The hydraulic block for redundancy of an electronic braking device for vehicle of claim 5, wherein the motor mounting part is disposed on a front surface of the block body, and
the controller mounting part is disposed on a rear surface of the block body,
wherein one of the first and second output ports is disposed on the top surface of the block body with the first and second input ports, and
the other of the first and second output ports is disposed on the front surface of the block body and disposed under a pump mounting bore.

8. The hydraulic block for redundancy of an electronic braking device for vehicle of claim 5, wherein one of the drain input port and the drain output port is disposed on the top surface of the block body with one of the first and second input ports, the first output port and the second output port,
the other of the first and second input ports is disposed on the front surface of the block body, disposed under a pump mounting bore, and disposed on one side of the left and right sides of the motor mounting part, and
the other of the drain input port and the drain output port is disposed on the front surface of the block body, disposed under the pump mounting bore, and disposed on the other side of the left and right sides of the motor mounting part.

9. The hydraulic block for redundancy of an electronic braking device for vehicle of claim 5, wherein one of the drain input port and the drain output port is disposed on the top surface of the block body with one of the first and second output ports, the first input port and the second input port,
the other of the first and second output ports is disposed on the front surface of the block body, disposed under a pump mounting bore, and disposed on one side of the left and right sides of the motor mounting part, and
the other of the drain input port and the drain output port is disposed on the front surface of the block body, disposed under the pump mounting bore, and disposed on the other side of the left and right sides of the motor mounting part.

10. The hydraulic block for redundancy of an electronic braking device for vehicle of claim 5, further comprising one or more reservoir ports disposed on the block body and connected to a reservoir line for supplying operating fluid to a reservoir.

11. The hydraulic block for redundancy of an electronic braking device for vehicle of claim 10, wherein the hydraulic circuit further comprises:
a first braking flow path extended from the first input port to the first output port, and having hydraulic pressure controlled by one of the valves;
a second braking flow path extended from the second input port to the second output port, and having hydraulic pressure controlled by another of the valves;
a drain flow path extended from the bypass flow path to the one or more reservoir ports.

12. The hydraulic block for redundancy of an electronic braking device for vehicle of claim 10, wherein the one or more reservoir ports are disposed on the front surface of the block body, and disposed above a pump mounting bore.

13. The hydraulic block for redundancy of an electronic braking device for vehicle of claim 12, wherein the one or more reservoir ports comprise:
a first reservoir port disposed above the pump mounting bore, and disposed on one side of the left and right sides of the motor mounting part; and
a second reservoir port disposed above the pump mounting bore, and disposed on the other side of the left and right sides of the motor mounting part.

14. A hydraulic block for redundancy of an electronic braking device for vehicle, comprising:
a block body having a motor mounting part to which a motor is coupled and a controller mounting part to which an ECU (Electronic Control Unit) is coupled;
hydraulic control ports provided on the block body, and connected to a first output line of a main braking device and a first hydraulic braking line for individually adjusting wheels, in order to perform hydraulic braking on ones of front wheels and rear wheels;
drain ports provided on the block body, and connected to a second output line of the main braking device and a second hydraulic braking line for individually adjusting the wheels, in order to reduce the pressure of the others of the front wheels and the rear wheels; and
a hydraulic circuit configured to form a flow path of operating fluid in the block body, and control the flow rates and pressures of operating fluids passing through the hydraulic control ports and the drain ports, and having valves housed therein, the valves being mounted in the ECU, wherein the hydraulic control ports comprise:
an input port part connected to the first output line; and
an output port part connected to the first hydraulic braking line, the input port part comprises:
a first input port connected to one side of the first output line; and
a second input port connected to the other side of the first output line, the output port part comprises:
a first output port through which fluid introduced into the block body through the first input port is discharged; and
a second output port through which fluid introduced into the block body through the second input port is discharged, the motor mounting part is disposed on a front surface of the block body, the controller mounting part is disposed on a rear surface of the block body, one of the first and second input ports is disposed on a top surface of the block body with the first and second output ports, and the other of the first and second input ports is disposed on the front surface of the block body and disposed under a pump mounting bore.

* * * * *